United States Patent
Pierce et al.

(10) Patent No.: US 6,370,461 B1
(45) Date of Patent: Apr. 9, 2002

(54) CRASH CONTROL SYSTEM FOR VEHICLES EMPLOYING PREDICTIVE PRE-CRASH SIGNALS

(75) Inventors: Bruce Frederick Pierce, Farmington Hills; David J. Bauch, South Lyon; David Edward Winnard, Milford; Rouaa Nakhleh, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/604,142

(22) Filed: Jun. 27, 2000

(51) Int. Cl.[7] .......................... B60R 22/00; G06F 17/00
(52) U.S. Cl. .......................... 701/45; 701/36; 280/734; 280/735; 340/436
(58) Field of Search ..................... 701/45, 36; 280/734, 280/735; 340/436, 500

(56) References Cited

U.S. PATENT DOCUMENTS

| | | | |
|---|---|---|---|
| 4,206,636 A | | 6/1980 | Hendrix |
| 4,990,886 A | | 2/1991 | Stanulis |
| 5,153,559 A | | 10/1992 | Atsumi |
| 5,158,343 A | | 10/1992 | Reichelt et al. |
| 5,748,473 A | * | 5/1998 | Breed et al. ................. 701/45 |
| 5,781,105 A | | 7/1998 | Bitar et al. |
| 5,809,437 A | * | 9/1998 | Breed .......................... 701/29 |
| 5,825,098 A | * | 10/1998 | Darby et al. ................ 307/10.1 |
| 5,831,342 A | * | 11/1998 | Vivacqua et al. ........... 307/10.1 |
| 5,835,873 A | * | 11/1998 | Darby et al. .................... 701/45 |
| 5,860,674 A | | 1/1999 | Corrado |
| 5,900,677 A | * | 5/1999 | Musiol et al. .............. 307/10.1 |
| 5,921,641 A | | 7/1999 | Lupges et al. |
| 5,927,821 A | | 7/1999 | Bauer et al. |
| 5,941,608 A | | 8/1999 | Campau et al. |
| 6,042,145 A | * | 3/2000 | Mitschelen et al. .......... 280/735 |
| 6,188,940 B1 | * | 2/2001 | Blackburn et al. ............. 701/45 |
| 6,189,923 B1 | * | 2/2001 | Tsubone ...................... 280/735 |
| 6,212,454 B1 | * | 4/2001 | Foo et al. ....................... 701/45 |
| 6,242,701 B1 | * | 6/2001 | Breed et al. ................. 177/144 |
| 6,246,937 B1 | * | 6/2001 | Miyaguchi et al. ........... 701/45 |

* cited by examiner

Primary Examiner—William A. Cuchlinski, Jr.
Assistant Examiner—Olga Hernandez
(74) Attorney, Agent, or Firm—Jennifer Stec

(57) ABSTRACT

A crash control system for vehicles employs pre-crash surrogate signals to predict a potential crash. The predictive signals may be generated by activation of the vehicle's anti-lock brakes, or by a sensor that detects rate of brake pedal travel indicating panic braking or by advanced radar systems. The pre-crash signals may be used to ready various safety systems on the vehicle, such as chassis and suspension systems, dynamic body systems, interior occupant protection systems and other systems that function to improve vehicle's crash worthiness or assist in improving vehicle stability or control. The pre-crash signals may also be used to modify the normal trigger points of safety systems to improve the timing of their response.

16 Claims, 2 Drawing Sheets

CRASH CONTROL SYSTEM FOR VEHICLES EMPLOYING PREDICTIVE PRE-CRASH SIGNALS

TECHNICAL FIELD

The present invention generally relates to vehicles safety systems that are deployed at the time of a crash or pre-crash avoidance action and deals more particularly with a system that uses predictive pre-crash signals to pre-arm or precondition the vehicle's safety systems.

BACKGROUND OF THE INVENTION

Safety systems for passenger vehicles have become more prevalent and increasingly sophisticated in recent years as newly enabling technologies evolve. For example, energy absorbing systems such as air bags, anti-lock brakes, and skid control systems have become commonplace on newer vehicles. These safety systems are normally activated immediately before an actual crash, or by loss of control of the vehicle, by means of sensors that detect the onset of the crash or loss of vehicle control. For example, chassis or body-mounted accelerometers are commonly employed to actuate air bags that protect the vehicle's occupants upon crash impact. In order for existing safety systems to operate effectively, it is critical that the system be fully activated within a very short time frame preceding the crash or other emergency condition. Because of limitations on the amount of time available for crash detection and deployment of the safety systems, there is limited opportunity to utilize those types of safety systems that require longer periods for arming or deployment. An opportunity exists to further enhance safety outcomes through these systems with improved prediction capabilities.

The concept of providing early warning of a vehicle emergency is generally known. For example, U.S. Pat. No. 5,158,343 to Reichelt et al discloses a system that reduces braking distance by sensing the rate of movement of a brake pedal and actuating a pre-braking sequence that reduces the time required to activate a vehicle's brakes. Similarly, U.S. Pat. No. 5,860,674 to Corrado discloses a system in which sensed brake pressure indicating an emergency condition is used to actuate an air bag system. None of these prior art systems are used in connection with safety systems that require time periods for deployment that exceed the time period for advanced warning provided by typical sensors. The present invention is directed toward overcoming the deficiencies of the prior art discussed above, thereby creating new opportunities to utilize a variety of advanced safety systems.

SUMMARY OF THE INVENTION

According to one aspect of the invention, a crash control system for a vehicle is provided, comprising a first sub-system on the vehicle for controlling a first operating function of the vehicle and generating a signal predicting of an imminent potential crash of the vehicle, a second sub-system on the vehicle for controlling a second operating function of the vehicle, and a controller on the vehicle for receiving the predictive signal and for altering the operation of the second sub-system, in order to ready the vehicle for a crash. The first sub-system may include a sensor for sensing the rate which a brake pedal on the vehicle is actuated. Alternatively, the vehicle's anti-lock braking system or adaptive cruise control system may be employed to generate the predictive pre-crash signal. The second sub-system may include any of a variety of safety systems carried on the chassis, body or interior of the vehicle. For example, the second sub-system may comprise a steering wheel and means for automatically adjusting the position of the steering wheel before a crash, an improved air suspension system for quickly lowering the vehicle's center of gravity, continuously variable semi-active damping, interactive vehicle dynamics, seat adjustment mechanisms, and similar safety systems.

According to another aspect of the invention, a method is provided for readying a vehicle for a potential crash, comprising the steps of sensing a first parameter relating to the operation of a braking system on a vehicle; using the sensed parameter to generate a signal that is predictive of the crash; and, readying a safety system on the vehicle when the predictive signal has been generated.

Accordingly, it is a primary object of the present invention to provide a crash control system for vehicles using predictive pre-crash signals that enable the use of new safety systems and crash control countermeasures.

Another object of the invention is to provide a system as described above which provides earlier warning of a potential vehicle crash so as to allow arming or deployment of safety systems that require additional time to make ready prior to a crash.

Another object of the invention is to provide a system of the type mentioned above which uses existing vehicle systems to generate the predictive pre-crash signals.

These, and further objects and advantages of the present invention will be made clear or will become apparent during the course of the following description of a preferred embodiment of the invention.

BRIEF DESCRIPTION OF THE DRAWINGS

In the drawings, which form an integral part of the specification and are to be read in conjunction therewith, and in which like reference numerals are employed to designate identical components in the various views.

DESCRIPTION OF THE PREFERRED EMBODIMENT

Figure 1:
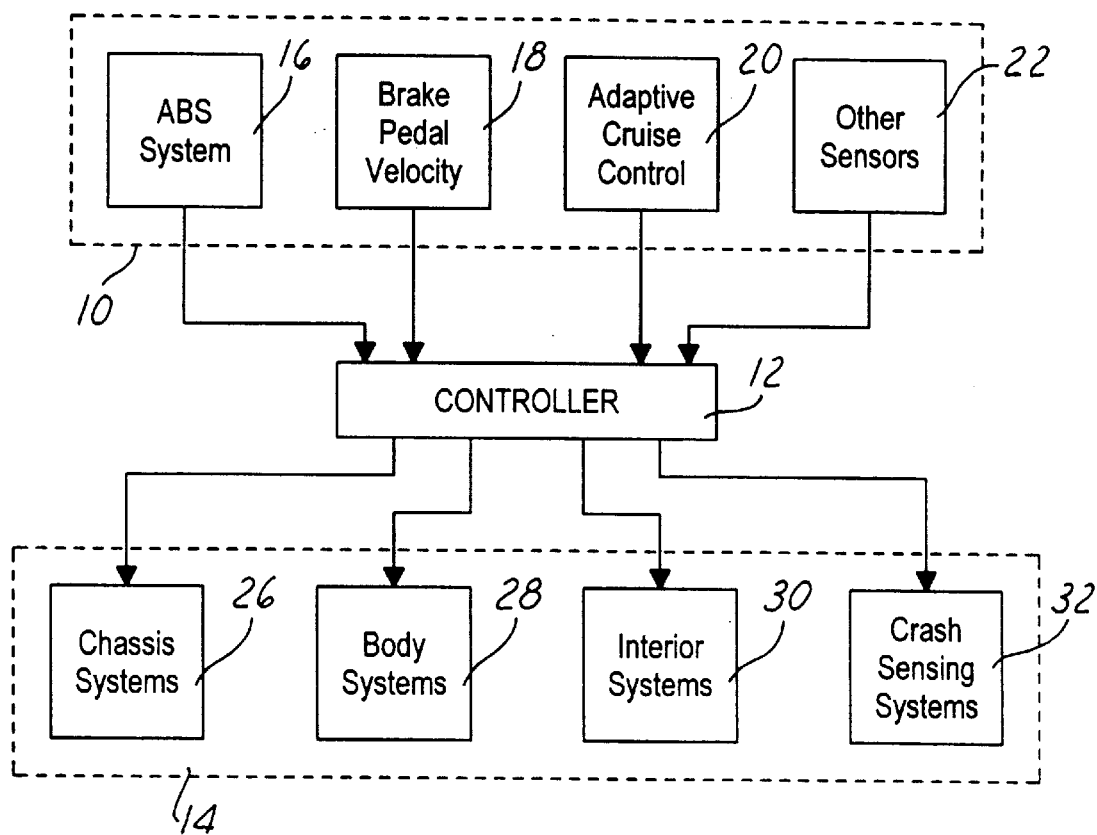
FIG. 1 is a broad block diagram of the crash control system for vehicles that forms the preferred embodiment of the present invention; and, FIG. 2 is a combined block and diagrammatic view of the system shown in FIG. 1.

Referring first to FIG. 1, the present invention relates to a crash control system for vehicles that employs predictive pre-crash surrogate signals that are generated by any of a plurality of existing sub-systems 10 on a vehicle. The sub-systems 10 may comprise an ABS (Antilock Brake System) 16, a brake pedal velocity sensor 18, an adaptive cruise control system 20, or any other appropriate sensor 22 on the vehicle that provides early warning that the driver may lose vehicle control or that a potential crash may be imminent. The signal produced by the ABS system 16 may be either that signal which activates the system 16, or another system signal that is generated immediately upon activation of the system 16. The brake pedal velocity sensor 18 is a of a known type, typically mounted on nor near the vehicle's brake pedal and functions to sense the rate of downward travel of the brake pedal during a braking sequence. The rate of pedal travel is compared against a reference value to determine whether the rate of travel indicates a panic-braking mode.

The adaptive cruise control system 20 is of the type employing a distance measuring system which may comprise radar for example, that measures the distance between the radar carrying vehicle, and a second vehicle ahead or behind of the radar carrying vehicle. The distance measuring system determines the rate of closure of the leading or trailing vehicle, and when the measured distance is less than a threshold value, the cruise control system is disabled, and in some cases the vehicle's brakes are actuated to avoid a collision. Typically, adaptive cruise control systems produce signals indicative of the rate of closure, and according to the present invention, these signals can be used to produce a surrogate signal indicative of a potential crash. A number of other sensors 22 carried on the vehicle may also be used to produce a surrogate signal. In any event, the signals produced by the sub-systems 10 are delivered to a controller 12 which typically includes a microcomputer provided with memory and a pre-programmed set of instructions.

The controller 12 may be a dedicated system, or may be incorporated into an existing body or chassis electronic control module. In some cases, where the surrogate signals are generated by the ABS system 16, the controller 12 essentially acts to receive the signal and uses it as a trigger to arm or activate any of a plurality of second sub-systems 14 which comprise safety systems that either prepare the vehicle for a crash impact or carry out countermeasures aimed at reestablishing control of the vehicle. In other cases, however, the controller uses the values or states of the input signals to calculate values that are compared to reference values in order to generate signals that are delivered to the sub-systems 14. For example, the signal delivered to the controller 12 by the brake pedal velocity sensor 18 represents the rate at which the brake pedal is depressed. The controller 12 compares this rate value with a reference value associated with an emergency condition, and when the value of the received signal exceeds that of the reference value, controller 12 delivers an arming or actuation signal to one of the sub-systems 14. In a similar manner, the signal delivered by the adaptive cruise control system 20 to the controller 12 consists of rate of closure information. The controller 12 compares the closure rate with a reference value, and depending upon the results of that comparison, issues an arming or actuation signal to one or more of the sub-systems 14.

As previously discussed, the second sub-systems 14 may comprise any of a variety of safety systems whose purpose is to protect the vehicle's occupants, mitigate the effects of a crash, or reestablish control of the vehicle either directly or through assisting the driver indirectly. These systems can be broadly categorized as the vehicle's chassis systems 26, body systems 28, interior systems 30 and other crash sensing systems 32. Generally, the pre-crash predictive signals issued by the controller 12 can be used by the suspension system 24 and chassis systems 26 to lower the air suspension of a vehicle in order to improve the compatibility of energy absorbing systems and lower the vehicle's center of gravity to enhance vehicle stability, as well as to provide information that is used to potentially engage active countermeasure systems. Such countermeasures can be made available through advanced chassis systems, such as continuously variable semi-active damping and interactive vehicle dynamics that can assist in maintaining vehicle stability or control. Body systems 28 may employ the predictive systems to lower the threshold for crash sensing, thereby reducing the "gray zone" for restraint firing decisions, and to provide an interrupt signal to occupant sensors in order to provide a status check immediately preceding the crash impact. Thus, for example, seat weight sensors or occupant spatial sensors could be checked immediately before the deployment of air bags.

Interior systems 30 may employ the predictive signals to control systems that adjust seat positions (either track position or seat back angle), active seat energy absorbing systems, or systems for adjusting the position of the steering wheel or the steering column in order to enhance safety outcomes of a crash.

Figure 2:
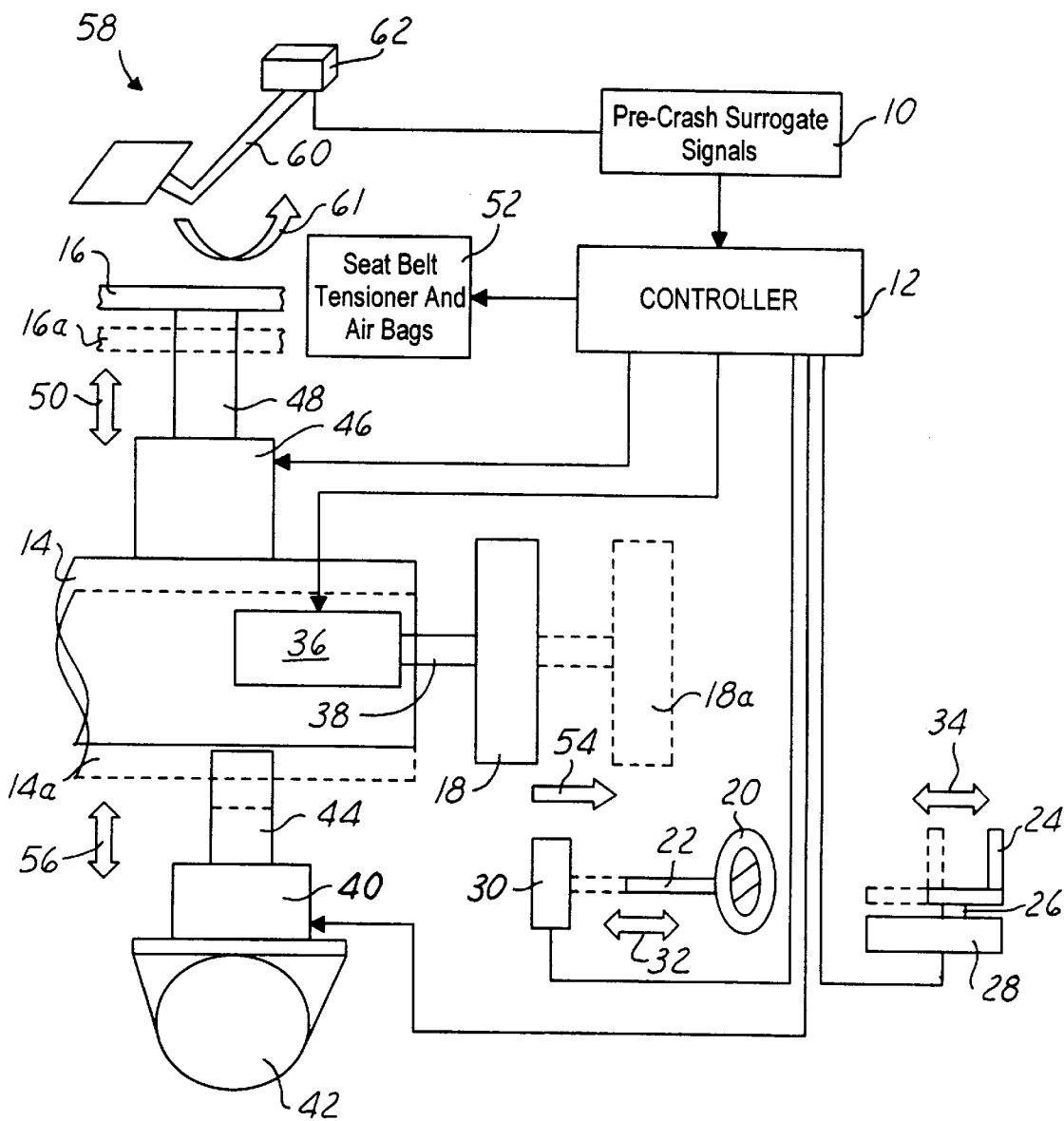

Attention is now also directed to FIG. 2 which shows in more detail, certain components of the sub-systems 10, 14. A brake pedal assembly 58 comprises a pedal arm 60 which is displaced in the direction of arrow 61 to activate the vehicle's brakes. The rate of travel of the brake arm 60 is detected by a conventional position sensor 62, that may comprise, for example, a rotary position potentiometer that outputs a signal indicative of brake position or rate of travel of the brake arm 60, which forms a pre-crash predictive or surrogate signal that is delivered to the controller 12 as part of one of the sub-systems 10. Where the signal delivered to the controller 12 from the sensor 62 is merely indicative of pedal position, then the controller 12 functions to calculate the rate of pedal travel and compares this rate to a reference value representative of a panic braking situation.

In response to receipt of one of the surrogate signals, the controller 12 issues any number of signals to body, chassis and interior safety systems, several of which will now be described by way of illustration. For example, controller 12 may issue a control signal to a vehicle seat controller mechanism 28 which moves the position of a seat 24 mounted on a track assembly 26 for bi-directional movement indicated by the arrow 34. When a pre-crash predictive signal is generated by one of the sub-systems 10, the seat adjustment mechanism 28 may move the seat 24 rearwardly to create more space between the vehicle's steering wheel/steering column and the driver. In a similar manner, the controller 12 may issue a control signal to a powered mechanism 30 that moves the steering column 22 bi-directionally as shown by the arrow 32, which in turn moves the steering wheel 20 away from the driver. When a pre-crash predictive signal is issued, the controller 12 may cause the mechanism 30 to move the steering column 22 away from the driver, thereby mitigating potential driver injury on impact.

A suspension system is shown as comprising a pneumatic cylinder 40 supported by an axle 42. The air suspension cylinder 40 includes a piston 44 that supports a vehicle frame member 14. A change in air pressure in cylinder 40 moves piston 44 either upwardly or downwardly in the direction of arrow 56, thereby changing the height of the frame 14, and thus the height of the vehicle's body and energy absorbing structures. In response to the receipt of a pre-crash surrogate signal, the controller 12 issues a signal that reduces the air pressure in cylinder 14, thereby causing the chassis member 14 to move downwardly to the position shown in the phantom and indicated by the numeral 14a. This reduction in chassis height in turn lowers the center of gravity of the vehicle, thereby providing additional stability and control, which is especially important in larger vehicles having a high center of gravity. In a similar manner, a signal issued by controller 12 can be used to better align an energy-absorbing member such as the bumper 18 for impact. For example, in response to a signal issued by the controller 12, a pneumatic cylinder 36 drives a piston rod 38 outwardly to displace the bumper 18 in the direction of the arrow 54 to a position indicated in the phantom and designated by the numeral 18a. With the bumper 18 thusly extended, the vehicle is armed to absorbed additional energy upon impact with another vehicle or an object. Alternatively, adjustment of ride height could be performed via air suspension to better align energy absorbing members of impacting vehicles, especially vehicles like trucks.

As mentioned earlier, a range of interactive vehicle dynamics can be used to mitigate crashes or maintain/regain vehicle control. For example, yaw-sensing systems typically are desensitized to prevent false activation due to normal driving situations. In cooperation of a signal predicting a crash event may be used to reduce the activation threshold, allowing such systems a broader scope of operation. A range of other safety systems can be operated by the controller 12 to increase their available response time, such as a conventional seat belt tensioner and air bag 62.

From the foregoing, it is apparent that the crash control system of the present invention not only provides for the reliable accomplishment of the objects of the invention, but does so in an effective and economical manner. It is recognized, of course, that those skilled in the art may make various modifications or additions chosen to illustrate the preferred embodiment without departing from the spirit and scope of the present contribution to the art. Accordingly, it is to be understood that the protection sought and to be afforded hereby should be deemed to extend to the subject matter claimed and all equivalents thereof fairly within the scope of the present invention.

What is claimed is:

1. A crash control system for a vehicle, comprising:
   a first subsystem on said vehicle for controlling a first operating function of said vehicle and generating a signal predictive of an imminent potential crash of said vehicle;
   a second subsystem on said vehicle for controlling a second operating function of said vehicle, said second subsystem includes a suspension control system; and
   a controller on said vehicle for receiving said predictive signal and altering the operation of said suspension control system to lower a chassis of said vehicle to lower the center of gravity and to ready said vehicle for said crash.

2. The crash control system of claim 1, wherein said first subsystem includes an antilock braking system for controlling the operation of a set of brakes on said vehicle, and said predictive signal comprises a signal related to the activation of said antilock braking system.

3. The crash control system of claim 1, wherein said first subsystem includes a sensor for sensing the rate at which a brake pedal of said vehicle is actuated by a driver of said vehicle.

4. The crash control system of claim 1, wherein said first system includes an adaptive cruise control system having a distance measuring system for measuring the rate of closure between said vehicle an object with which said vehicle may collide.

5. The crash control system of claim 1, wherein said second system includes a steering wheel and means operated by said controller for adjusting the position of said steering wheel before said crash.

6. The crash control system of claim 1, wherein said second system adjusts an adjustable ride height.

7. A crash control system for a vehicle, comprising:
   braking system on said vehicle, said braking system including a brake pedal and means for generating a signal predictive of an imminent potential crash of said vehicle, said signal generating means includes a sensor for sensing the rate of movement of said pedal and generating said predictive signal;
   a safety system on said vehicle for readying said vehicle for said crash;
   a controller on said vehicle and responsive to said predictive signal for activating said safety system prior to said crash.

8. The crash control system of claim 7, wherein said braking system includes an anti-lock braking system and said predictive signal is generated by said antilock braking system.

9. The crash control system of claim 7, wherein said safety system includes a suspension control system for reducing the height of a chassis on said vehicle, whereby the center of gravity of said vehicle is lowered.

10. A method of readying a vehicle for a potential crash, comprising the steps of:
    (A) sensing a first parameter related to the operation of a braking system on said vehicle, including detecting the rate at which a brake pedal on said vehicle is depressed;
    (B) using the parameter sensed in step (A) to generate a signal that is predictive of said crash; and
    (C) readying a safety system on said vehicle when said predictive signal is generated in step (B).

11. The method of claim 10, wherein step (A) includes detecting the activation of an anti-lock braking system on said vehicle.

12. The method of claim 10, wherein step (C) includes adjusting a suspension system of said vehicle.

13. The method of claim 10, wherein step (C) includes checking the status of occupants in said vehicle and modifying the operation of an energy absorbent system for protecting said occupants during a crash.

14. The method of claim 10, wherein step (C) includes displacing the position of a steering wheel of said vehicle.

15. The method of claim 10, wherein step (C) includes altering the position of an occupant seat in said vehicle.

16. The method of claim 10, wherein step (C) includes:
    sensing a second parameter related to the operation of said vehicle,
    comparing said second parameter with a threshold value indicative of a crash,
    activating a crash mitigation system on said vehicle based on said comparing step,
    modifying said threshold value based on the value of said first parameter.

* * * * *